Patented Nov. 20, 1934

1,980,996

UNITED STATES PATENT OFFICE 1,980,996

PROCESS FOR THE PREPARATION OF CALCIUM LACTOBIONATE

Horace S. Isbell, Washington, D. C., assignor to the Government of the United States, represented by the Secretary of Commerce No Drawing. Application April 10, 1933, Serial No. 665,343

3 Claims. (Cl. 260—112)

(Granted under the act of March 3, 1883, as amended April 30, 1928; 370 O. G. 757)

This application is made under the act of March 3, 1883, as amended by the act of April 30, 1928, and the invention herein described may be manufactured and used by or for the Government of the United States for governmental purposes without the payment to me of any royalty thereon.

This invention relates to a process for the preparation of calcium lactobionate.

The object of this invention is to provide an improved process for separating calcium lactobionate from the products which result from the oxidation of lactose.

Heretofore, calcium lactobionate has been obtained only in a noncrystalline amorphous state by expensive methods. Fischer and Meyer (Ber. 22, 361; 1889) prepared calcium lactobionate by oxidizing lactose with bromine and separating the crude lactobionic acid as calcium lactobionate, which was purified by repeated precipitation with alcohol. But they were unable to obtain a crystalline product. Hudson and Isbell (J. Am. Chem. Soc. vol. 51, p. 2227; 1929) prepared calcium lactobionate from lactose by oxidation with bromine in the presence of barium benzoate and separated the by-product, barium bromide, by means of sulphuric acid, lead carbonate and silver benzoate. A basic calcium salt was then precipitated from which the normal salt was obtained. Notwithstanding these expensive purification steps Hudson and Isbell were not able to obtain a crystalline product.

In the present invention calcium lactobionate is obtained from the basic calcium lactobionate, prepared directly from the oxidation products of lactose, without the expensive purifications previously used. Thus, crude calcium lactobionate is caused to react with lime, thereby producing difficultly soluble basic calcium lactobionate, which is separated and washed free from soluble impurities and finally treated with carbon dioxide thereby forming calcium carbonate and normal calcium lactobionate. The new process has the advantage that the inorganic salts which usually accompany crude calcium lactobionate are removed without the use of any expensive reagents and the resulting product is pure as evidenced by the fact that it may be brought to crystallization.

In the practice of my invention the calcium lactobionate may be conveniently prepared from lactose by electrolytic oxidation in the presence of calcium carbonate and a bromide, separating the calcium lactobionate first in the form of a crystalline calcium bromide double salt and then treating this with an excess of lime to cause the precipitation of a basic calcium lactobionate from which the normal salt is prepared by carbonation. The calcium lactobionate thus obtained may be brought to crystallization by concentrating the aqueous solution of the salt to a thick sirup and preferably seeding with the crystalline substance. The salt may be crystallized from water solution or from aqueous alcohol. The mother liquor from the basic calcium lactobionate may be returned to the electrolytic cell, thereby utilizing the bromide for the preparation of a new batch of calcium lactobionate.

If the process of the present invention is used in connection with electrolytic oxidation of lactose the several steps are conveniently as follows:

About 180 grams (.5 mole) of lactose are dissolved in 1 liter water and 10 grams bromine and 35 grams calcium carbonate are added in portions and the mixture submitted to electrolytic oxidation using graphite electrodes. When the oxidation is nearly complete, as shown by the amount of reducing sugar in solution, electrolytic action is terminated. The crude calcium lactobionate is then treated with about 100 grams hydrated lime to precipitate a basic calcium lactobionate. This compound, when anhydrous, has the formula $$Ca(C_{12}H_{21}O_{12})_2 4CaO.$$

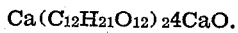

It is best precipitated slowly in order to build up the particles so that they may be separated easily on a filter. A satisfactory precipitate is obtained by allowing the solution of the calcium lactobionate, calcium bromide and milk of lime to flow simultaneously into a mixing chamber, the milk of lime being kept preferably somewhat in excess. The mixture is then heated to about 90° C. in order to complete the precipitation. The precipitate is largely $$Ca(C_{12}H_{21}O_{12})_2 4CaO.$$

It is collected on a filter and washed free from bromides with lime water. This crude basic salt is suspended in water and carbonated in order to remove the lime. The insoluble calcium carbonate is separated from the soluble calcium lactobionate and the solution of the latter is evaporated to a thick sirup and seeded with crystalline calcium lactobionate. The crystalline calcium lactobionate used for seed was originally prepared from an aqueous solution of calcium lactobionate which crystallized after long standing. The sirup containing the calcium lactobionate frequently becomes solid after seeding. The salt separates in double refracting microscopic needles which frequently occlude the mother liquor and form gelatinous masses. Vigorous stirring aids in obtaining crystals which are more easily handled.

If it is desired to prepare calcium lactobionate from calcium lactobionate-calcium chloride the steps are conveniently as follows: 1 mole of calcium lactobionate-calcium chloride $$Ca(C_{12}H_{21}O_{12})_2CaCl_2 6H_2O$$

is dissolved in about 5 liters hot water and mixed with 4 moles hydrated lime suspended in a small amount of water. The hot solution of $$Ca(C_{12}H_{21}O_{12})_2CaCl_2 6H_2O$$

and the milk of lime are allowed to flow slowly with stirring into a reaction flask in which basic calcium lactobionate is precipitated. The resulting basic calcium lactobionate is collected on a filter and washed with lime water. It is next suspended in water and carbonated until the difficultly soluble basic salt is changed to the soluble normal salt. The mixture is separated by filtration. The filtrate contains normal calcium lactobionate, which may be brought to crystallization by concentrating to a sirup containing about 75% dry substance.

Having thus described my invention, what I claim is:

1. Process for the preparation of calcium lactobionate consisting in causing calcium lactobionate-calcium halide to react with lime giving difficultly soluble basic calcium lactobionate, separating the basic salt from the soluble impurities, and then converting it to normal calcium lactobionate by carbonation in water suspension.

2. Process for the preparation of calcium lactobionate consisting in subjecting lactose to electrolytic oxidation in the presence of calcium bromide and calcium carbonate, separating the crude calcium lactobionate thus formed as crystalline calcium lactobionate-calcium bromide, causing the calcium lactobionate-calcium bromide to react with lime to give basic calcium lactobionate, separating the basic salt from the solution containing the impurities by filtration, then converting it to normal calcium lactobionate by carbonation.

3. Process for the preparation of calcium lactobionate consisting in treating calcium lactobionate-calcium halide with approximately 4 equivalents of lime for each equivalent of calcium lactobionate, causing the separation of basic calcium lactobionate, and the subsequent decomposition of the basic salt to give calcium lactobionate.

HORACE S. ISBELL.